US008326995B2

(12) United States Patent
 Chesta

(10) Patent No.: US 8,326,995 B2
(45) Date of Patent: Dec. 4, 2012

(54) METHOD AND APPARATUS FOR ACCESSING CONTEXT INFORMATION

(75) Inventor: Christina Chesta, Turin (IT)

(73) Assignee: Motorola Mobility LLC, Libertyville, IL (US)

( * ) Notice: Subject to any disclaimer, the term of this patent is extended or adjusted under 35 U.S.C. 154(b) by 606 days.

(21) Appl. No.: 12/510,443

(22) Filed: Jul. 28, 2009

(65) Prior Publication Data
 US 2010/0036914 A1   Feb. 11, 2010

(30) Foreign Application Priority Data

Aug. 6, 2008 (EP) .................................. 08425542

(51) Int. Cl.
 *G06F 15/16* (2006.01)
(52) U.S. Cl. ........................................ 709/227; 709/235
(58) Field of Classification Search .................. 709/227
 See application file for complete search history.

(56) References Cited

U.S. PATENT DOCUMENTS

| | | | | |
|---|---|---|---|---|
| 7,171,415 B2 * | 1/2007 | Kan et al. | ............................... | 1/1 |
| 7,206,841 B2 | 4/2007 | Traversat et al. | | |
| 7,315,885 B2 * | 1/2008 | Weisshaar et al. | ............ | 709/217 |
| 7,533,172 B2 * | 5/2009 | Traversat et al. | ............ | 709/225 |
| 7,603,112 B2 * | 10/2009 | Huomo et al. | ............ | 455/414.2 |
| 7,774,495 B2 * | 8/2010 | Pabla et al. | .................... | 709/238 |
| 7,778,260 B2 * | 8/2010 | Sturniolo et al. | ............ | 370/401 |
| 7,987,491 B2 * | 7/2011 | Reisman | ........................ | 725/112 |
| 8,037,202 B2 * | 10/2011 | Yeager et al. | ................. | 709/238 |
| 8,077,634 B2 * | 12/2011 | Maggenti et al. | ............ | 370/260 |
| 2002/0173295 A1 | 11/2002 | Nykanen et al. | | |
| 2004/0064693 A1 * | 4/2004 | Pabla et al. | ................... | 713/168 |

(Continued)

FOREIGN PATENT DOCUMENTS

EP   1710972 A1 * 10/2006

(Continued)

OTHER PUBLICATIONS

Patent Cooperation Treaty, International Search Report and Written Opinion of the International Searching Authority for International Application No. PCT/US2009/52535, Dec. 17, 2009, 09 pages.

(Continued)

*Primary Examiner* — Lynn Feild
*Assistant Examiner* — Melvin H Pollack

(57) ABSTRACT

A method (300) and apparatus (200) for accessing context information is disclosed. The method may include providing (320) a virtual data source registry (140) corresponding to a local rendezvous point (130) local to a device (110) and a remote rendezvous point (150) remote from the device, where the local rendezvous point can correspond to locally available context information available local to the device and the remote rendezvous point can correspond to remotely available context information available remote from the device. The method may also include receiving (330), at the virtual data source registry, join requests from multiple applications, where the join requests can request context information from a context source. The join requests can include a local join request from a device application (161) in the device to the local rendezvous point. The method may include receiving (340) context information at the virtual data source registry from the context source, returning (350) locally available context information from the local rendezvous point to the device application in response to receiving the local join request, and multicasting (360) remotely available context information from the remote rendezvous point to the multiple applications in response to receiving the join requests.

18 Claims, 6 Drawing Sheets

U.S. PATENT DOCUMENTS

| | | | |
|---|---|---|---|
| 2004/0100983 A1 | 5/2004 | Suzuki | |
| 2004/0187133 A1* | 9/2004 | Weisshaar et al. | 718/100 |
| 2005/0003804 A1* | 1/2005 | Huomo et al. | 455/414.1 |
| 2005/0071489 A1 | 3/2005 | Parupudi et al. | |
| 2006/0148528 A1* | 7/2006 | Jung et al. | 455/566 |
| 2007/0147372 A1 | 6/2007 | Liu et al. | |

FOREIGN PATENT DOCUMENTS

| | | |
|---|---|---|
| GB | 2445003 A | 12/2006 |

OTHER PUBLICATIONS

Extended European Search Report Communication, European Patent Office, Munich, Germany, Jun. 3, 2009, all pages.

Foundation for Intelligent Physical Agents, "FIPA Agent Management Specification", SC00023K, FIPA TC Agent Management, Mar. 18, 2004, pp. 1-43.

* cited by examiner

METHOD AND APPARATUS FOR ACCESSING CONTEXT INFORMATION

BACKGROUND

1. Field

The present disclosure is directed to a method and apparatus for accessing context information. More particularly, the present disclosure is directed to accessing context information from a plurality of context sources.

2. Introduction

Presently, people can employ many different computing devices in their daily lives. Such computing devices can include mobile, stationary and embedded computers. Quite often applications on the devices do not operate with respect to a single location in a single context, as opposed to applications operating on isolated desktop computers. Rather the applications can operate with respect to activities occurring in a multitude of situations and locations including activities at offices, meeting rooms, homes, airports, hotels, classrooms, markets, buses, and other locations. Users of the devices can access their computing resources from wireless portable machines and also through stationary devices and computers connected to local area networks.

Context aware applications on the devices can be aware of the context in which they are run. A context-aware application can adapt its behavior to a changing environment. For example, context aware applications can adapt their operation according to the location of use, the collection of nearby people, the availability of hosts and accessible devices, changes to such things over time, and other context relevant situations. A device with these capabilities can examine the local environment context and react to changes to the environment. Aspects of context can include device location, proximity of other devices, other available resources, desired results, weather conditions, lighting, noise level, network connectivity, communication costs, communication bandwidth, social situations, as well as other context related factors.

Because context aware applications can access multiple resources in various situations, the applications may need to access local context resources on a corresponding device as well as remote context sources in a uniform way. A mechanism can be used to access data from remote context data sources and keep a repository of data source descriptions. Unfortunately, in such a mechanism, a new remote context source would typically need to be installed and registered in a local registry on a client device before it can be used. That installation and registration can waste memory resources at the client side. Additionally, there is presently no mechanism for dynamically adding new data sources to applications on a device. In many instances, new network sources are not discovered or made available to applications without reconfiguring or recompiling device software.

A context broker can provide a network addressable infrastructure service which permits providers to publish interface contracts and allows consumers to find services and use the published interfaces. Data is then transmitted directly from the provider to the consumer through a permanent connection. Unfortunately, a context broker does not optimize multiple requests from different consumers to a same provider. While a local context broker acts as a collector for the local data sources and application requests, the main analysis and reasoning tasks are performed remotely, which can be inefficient and can waste bandwidth resources. This is because broker discovery is time and resources consuming.

Furthermore, permanent, un-optimized, connections to remote resources, impact on costs and on usability of the connections to the resources. Additionally, current mechanisms do not optimize local storage on the device and do not optimize network bandwidth usage simultaneously.

Thus, there is a need for a method and apparatus for accessing context information.

SUMMARY

A method and apparatus for accessing context information is disclosed. In at least one embodiment, the method includes providing a virtual data source registry corresponding to a local rendezvous point local to a device and a remote rendezvous point remote from the device, where the local rendezvous point can correspond to locally available context information available local to the device and the remote rendezvous point can correspond to remotely available context information available remote from the device. The method further includes receiving, at the virtual data source registry, join requests from multiple applications, where the join requests can request context information from a context source. The join requests can include a local join request from a device application in the device to the local rendezvous point. The method still further includes receiving context information at the virtual data source registry from the context source, returning locally available context information from the local rendezvous point to the device application in response to receiving the local join request, and multicasting remotely available context information from the remote rendezvous point to the multiple applications in response to receiving the join requests.

In at least another embodiment, a device includes a housing, a local context source coupled to the housing, and a controller coupled to the housing. The controller can be configured to control operations of the device and configured to execute a device application. The device also includes a virtual data source registry coupled to the housing. The virtual data source registry can include a local rendezvous point local to the device and can include information corresponding to a remote rendezvous point remote from the device. The remote rendezvous point can correspond to remotely available context information available remote from the device. The local rendezvous point can be configured to access locally available context information. The virtual data source registry can be configured to receive join requests from multiple applications. The join requests can request context information from at least one context source. The join requests can include a local join request from the device application to the local rendezvous point. The virtual data source registry can be configured to receive context information from the at least one context source. The virtual data source registry can be configured to return the locally available context information from the local rendezvous point to the device application in response to receiving the local join request. The virtual data source registry can configured to multicast remotely available context information from the remote rendezvous point to the multiple applications in response to receiving the join requests.

In at least another embodiment, a method includes entering a peer relationship between a first rendezvous point and a plurality of device rendezvous points to create a virtual data source registry between the first rendezvous point and each of the plurality of device rendezvous points. The method further includes receiving context information at the first rendezvous point from a context source and receiving, at the first rendezvous point, join requests from the plurality of device rendezvous points. The join requests can request the context information from the context source. The join requests can include a device join request from a device application sent via a corresponding device rendezvous point. The method further includes multicasting the context information from the first rendezvous point to the plurality of device rendezvous points in response to receiving the join requests. The method still further includes receiving a leave request at the first rendezvous point from the device application sent via the corresponding device rendezvous point and ceasing multicasting context information from the first rendezvous point to the corresponding device rendezvous point in response to receiving the leave request.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
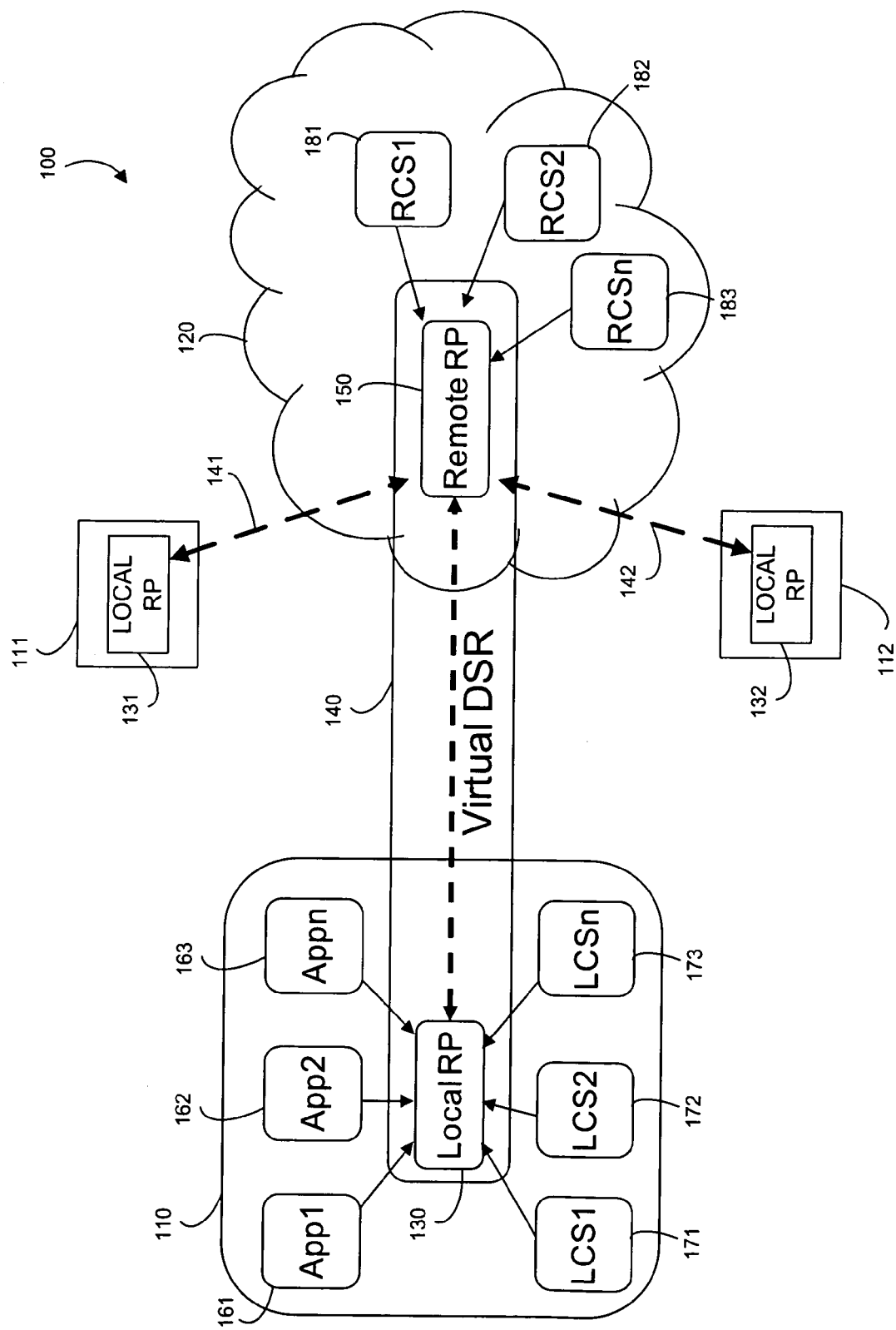
FIG. 1 illustrates an exemplary block diagram of a system according to a possible embodiment.

FIG. 1 is an exemplary block diagram of a system 100 according to a possible embodiment. The system 100 can include devices 110-112 and a network 120. Each device 110-112 can be a wireless communication device, such as a wireless telephone, a cellular telephone, a personal digital assistant, a pager, a personal computer, a selective call receiver, or any other device that is capable of sending and receiving communication signals on a network 120. The devices 110-112 can include local device rendezvous points 130-132. The device 110 can include at least one application 161-163 and at least one local context source 171-173. The other devices 111 and 112 may also include applications and context sources. The network 120 can include a remote rendezvous point 150 and at least one remote context source 181-183.

In operation, the remote rendezvous point 150 can enter a peer relationship with the device rendezvous points 130-132 to create a virtual data source registry 140-142 between the remote rendezvous point 150 and each of the device rendezvous points 130-132. The remote rendezvous point 150 can receive an advertisement of the context source 181 from the context source 181. The advertisement can inform the remote rendezvous point 150 of context information available from the context source 181. In response to receiving the advertisement, the remote rendezvous point 150 can register the context source 181 to receive context information from the context source 181. The remote rendezvous point 150 can receive a context source query from the device rendezvous point 130, where the context source query can include a query for the context source 181. The remote rendezvous point 150 can return, to the device rendezvous point 130, context source information about the context source 181 in response to receiving the context source query.

The remote rendezvous point 150 can receive join requests from the device rendezvous points 130-132, where the join requests can request the context information from the context source 181. The join requests can include a device application join request from a device application 161 sent via a corresponding device rendezvous point 130. A join request may include just a request to join a context information sharing session with a context source 181. A join request may include additional parameters, such as context information provided by a device application 161 and the remote rendezvous point 150 can use the additional parameters to aggregate and/or elaborate on context information sent in response to join request. The remote rendezvous point 150 can multicast the context information to the device rendezvous points 130-132 in response to receiving the corresponding join requests. The remote rendezvous point 150 can receive a leave request from the device application 161 sent via the corresponding device rendezvous point 130. The remote rendezvous point 150 can cease multicasting context information to the corresponding device rendezvous point 130 in response to receiving the leave request. Also, the remote rendezvous point 150 may continue to multicast context information to the corresponding device rendezvous point 130 if other applications 162 and 163 on the corresponding device 110 still desire the context information. Thus, the leave request may indicate that no more device applications corresponding to the device rendezvous point 130 desire the context information.

Local context sources 171-173 can also make their data available to and advertise themselves to the local device rendezvous point 130. In the virtual data source registry 140, the device rendezvous point 130 can be peered with the remote rendezvous point 150. The device rendezvous point 130 and the remote rendezvous point 150 together can be seen as a single virtual data source registry 140 from the applications 161-163 on the device 110. Remote context sources 181-183, such as web based services like traffic update services, weather services, online calendars, and other services, can transmit data to the remote rendezvous point 150. The remote rendezvous point 150 can also see the device rendezvous point 130 as a collection of virtual context sources 171-173 that are available on the device 110. When an application 161 desires context data, it can query the device rendezvous point 130 and use a join request to join a session to receive context source data. If the required information can be provided by a local context source 171 or it has already been downloaded from the network 120 and is still valid, the device rendezvous point 130 can return the information directly to the application 161. If the desired information is provided by a remote context source 181, the query can be forwarded to the remote rendezvous point 150 and the same join request can be forwarded to the remote rendezvous point 150 to obtain remote context information from the remote context source 181.

A rendezvous point 150 can create an ad-hoc group of devices 110-112 based on relevant parameters and the rendezvous point 150 can simultaneously deliver data from a context source 181 to the devices 110-112 in the group. The relevant parameters can be based on the location of the devices 110-112, based on similar requests for information from the devices 110-112, based on similar contexts of the devices 110-112, or based on other relevant parameters.

Figure 2:
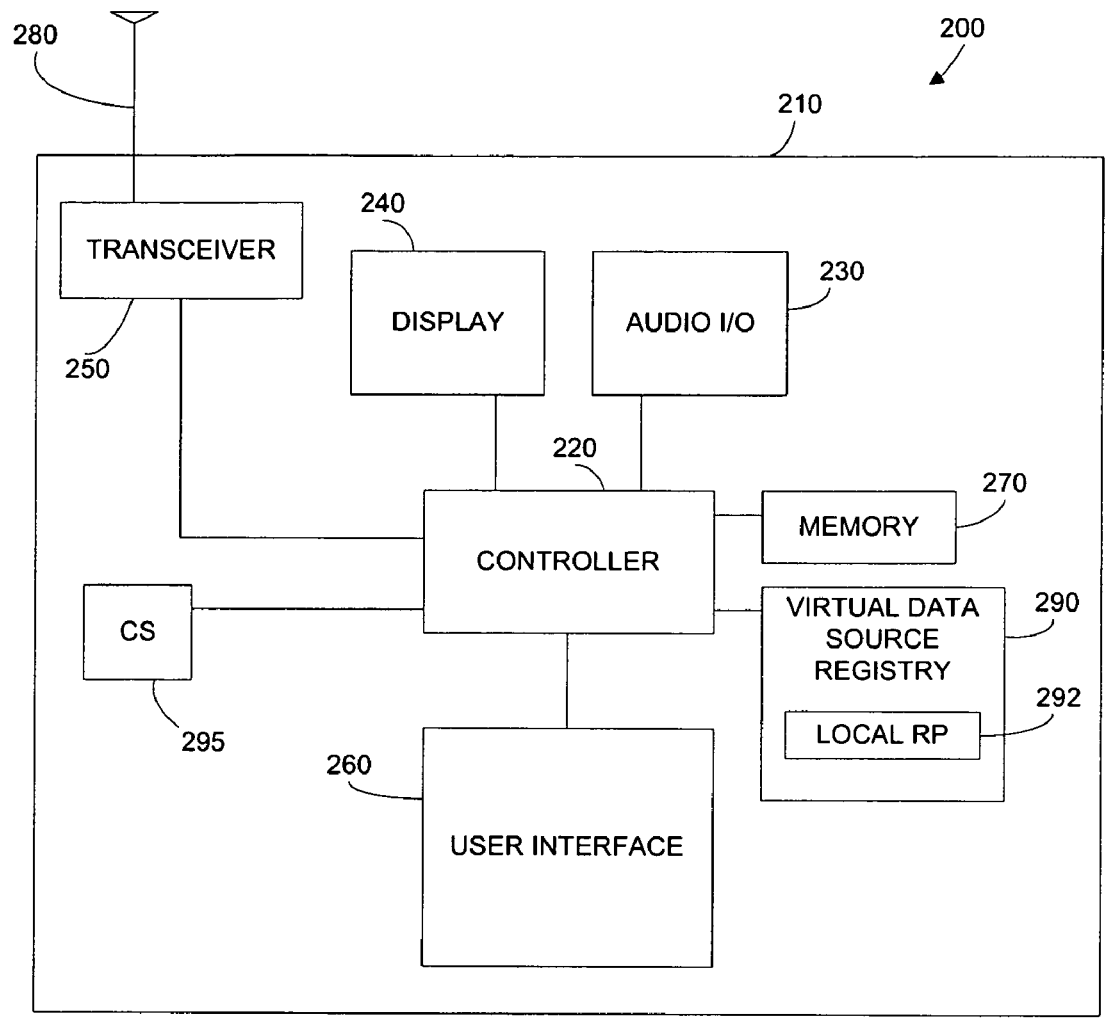
FIG. 2 illustrates an exemplary block diagram of a wireless communication device according to a possible embodiment.

FIG. 2 is an exemplary block diagram of a wireless communication device 200, such as the device 110, according to a possible embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, and an antenna 280 coupled to the housing 210 and the transceiver 250. The wireless communication device 200 can also include a virtual data source registry 290. The virtual data source registry 290 can include a local rendezvous point 292 local to the wireless communication device 200. The virtual data source registry 290 can include information corresponding to a remote rendezvous point, such as the rendezvous point 150, remote from the wireless communication device 200. Furthermore, the virtual data source registry 290 can include the remote rendezvous point that is separate from the wireless communication device 200. The remote rendezvous point can correspond to remotely available context information available remote from the wireless communication device 200. The virtual data source registry 290 can be coupled to the controller 220, can reside within the controller 220, can reside within the memory 270, can be an autonomous module, can be software, can be hardware, or can be in any other format useful for a virtual data source registry on a wireless communication device 200. The wireless communication device 200 can include at least one local context source 295. The local context source 295 can be a global positioning system module, a thermometer, a biometric sensor, a data source including data entered by a user, or any other source of local context information.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory, a subscriber identity module memory, or any other memory that can be coupled to a wireless communication device.

In operation, the controller 220 can control operations of the wireless communication device 200 and can execute at least one device application. The virtual data source registry 290 can receive an advertisement of the local context source 295 at the local rendezvous point 292 from the local context source 295 and register the local context source 295 at the local rendezvous point 292. The local rendezvous point 292 can access locally available context information. The virtual data source registry 290 can receive an advertisement of a remote context source at the remote rendezvous point from the remote context source and register the remote context source at the remote rendezvous point.

The virtual data source registry 290 can receive join requests from multiple applications. The join requests can request context information from at least one context source and the join requests can include a local join request from the device application to the local rendezvous point 292. The at least one context source can be a remote context source, the local context source 295, or any other context source. The local join request can include a request to join a session with the at least one context source to provide context information from the at least one context source to the device application.

The virtual data source registry 290 can receive context information from the at least one context source. The virtual data source registry 290 can return the locally available context information from the local rendezvous point 292 to the device application in response to receiving the local join request. The locally available context information can include context information from the local context source 295, can include locally stored context information from remote context sources, and/or can include any other locally available context information. The virtual data source registry 290 can multicast remotely available context information from the remote rendezvous point to the multiple applications in response to receiving the join requests. The virtual data source registry 290 can end the session with the device application after providing the context information.

Prior to receiving a join request, the local rendezvous point 292 can receive a query from the device application. For example, the controller 220 can query the local rendezvous point 292 with a query from the device application. The query can be a query for a context source of context information. The local rendezvous point 292 can return, to the device application, local context source information about the local context source 295 in response to receiving the query. Then, the local join request can include a request for locally available context information from the local context source 295. The virtual data source registry 290 can return the locally available context information from local context source 295 to the device application via the local rendezvous point 292 in response to receiving the local join request. The local rendezvous point 292 can alternately or additionally return, to the device application, remote context source information about a remote context source of remote context information in response to receiving the query. For example, the local rendezvous point 292 can send the query for a context source to the remote rendezvous point, receive, from the remote rendezvous point, remote context source information about a remote context source of context information, and forward the remote context source information to the device application via the controller 220. After sending the query and receiving the remote context source information, the local rendezvous point 292 can forward the local join request to the remote rendezvous point to request the remote context information from the remote context source and can provide the remote context information to the device application from the remote context source via the remote rendezvous point. The local join request may also include context information provided by the device application. For example, the forwarded join request may include local context information provided by the device application. The remote rendezvous point can focus research for remote context information and/or aggregate and filter the remote context information from different remote sources based on context information parameters included in the forwarded join request.

Figure 3:
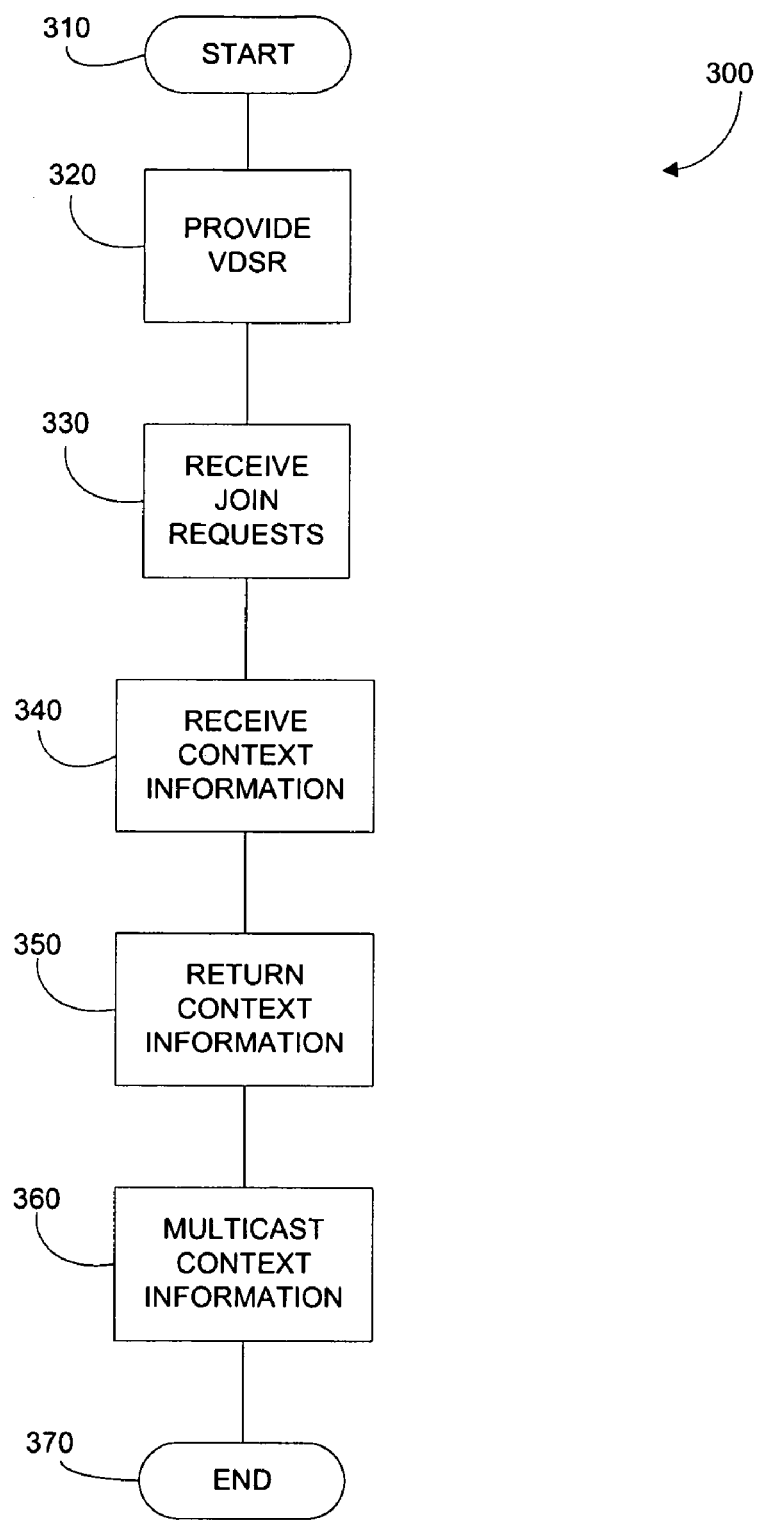
FIG. 3 is an exemplary flowchart illustrating the operation of a device according to a possible embodiment.

FIG. 3 is an exemplary flowchart 300 illustrating the operation of the device 110 and/or the system 100 according to a possible embodiment. At 310, the flowchart 300 begins. At 320, a virtual data source registry is provided. The virtual data source registry can correspond to a local rendezvous point local to a device and a remote rendezvous point remote from the device. The local rendezvous point can correspond to locally available context information available local to the device and the remote rendezvous point can correspond to remotely available context information available remote from the device. The virtual data source registry can include two rendezvous point layers, a first layer including the local rendezvous point and a second layer including the remote rendezvous point in a peer relationship with the local rendezvous point.

At 330, join requests are received at the virtual data source registry from multiple applications. The join requests can include a local join request from a device application in the device to the local rendezvous point. The join requests can request context information from a context source. For example, a join request can be any request for requesting update information from a context source. Context information can include presence information, location information, environment information, user preferences, personalized data with respect to a current context of a user or device, data relevant to a request, data pertinent to a particular interaction, or other data corresponding to a current situation or a desired situation of a user.

At 340, the virtual data source registry can receive context information from the context source. At 350, the local rendezvous point can return locally available context information to the device application in response to receiving the local join request. The locally available context information can be returned from a plurality of local context sources to one or more applications including the device application via the local rendezvous point. The locally available context information can also include context information that is stored locally on the device from remote context sources.

At 360, the remote rendezvous point can multicast remotely available context information to the multiple applications in response to receiving the join requests. The context information can be multicast from a rendezvous point to only the multiple applications that have requested updates from the context source. For example, a local or remote context source can provide information to a corresponding rendezvous point that can multicast the information to all requesting applications on a corresponding same device and multicast it to all requesting rendezvous points local to different devices that require it simultaneously. The remote rendezvous point can multicast remotely available context information from a plurality of remote context sources via the remote rendezvous point. At 370, the flowchart 200 can end.

Figure 4:
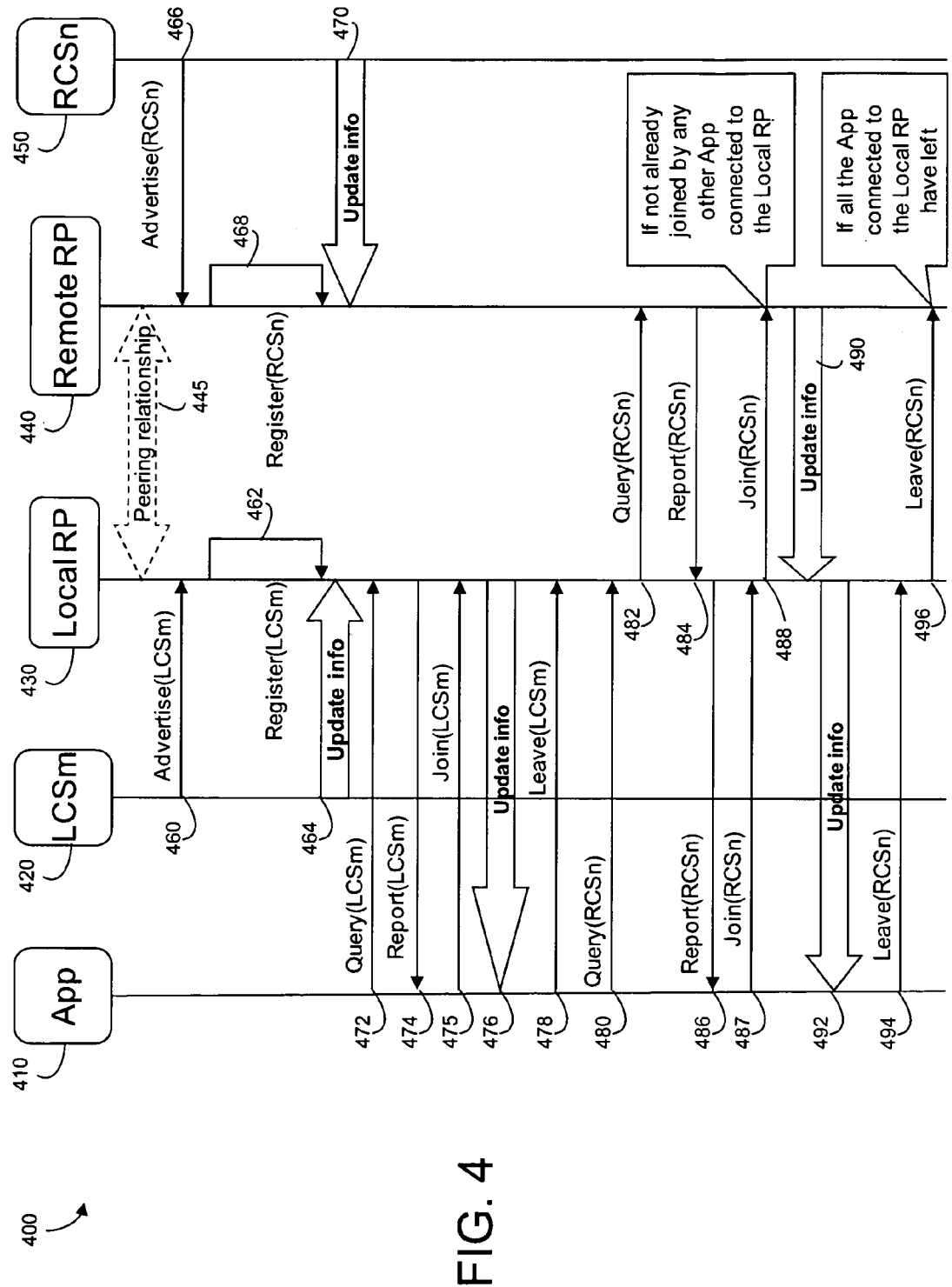
FIG. 4 is an exemplary signal flow diagram according to a possible embodiment.

FIG. 4 is an exemplary signal flow diagram 400 according to a possible embodiment. The signal flow diagram 400 illustrates signals sent between an application 410, at least one local context source 420, a local rendezvous point 430, a remote rendezvous point 440, and at least one remote context source 450. The application 410, the local context source 420, and the local rendezvous point 430 can be located on the same device. The local rendezvous point 430 and the remote rendezvous point 440 can be in a peering relationship 445 to create a virtual data source registry. The peering relationship can be created through configuration and/or advertising mechanisms.

In operation, in step 460, the local context source 420 can advertise itself and its available context information to the local rendezvous point 430. The advertisement can include an identifier, the kind of context information, the format of the context information, and other useful information. In step 462, the local rendezvous point 430 can register the local context source 420 in a registry of available context sources. In step 464, the local context source 420 can provide update context information to the local rendezvous point 430.

In step 466, the remote context source 450 can advertise itself and its available context information to the remote rendezvous point 440. In step 468, the remote rendezvous point 440 can register the remote context source 450 in a registry of available context sources. In step 470, the remote context source 450 can provide update context information to the remote rendezvous point 440. Remote context sources can include network based sources, web based sources, sources on other devices, and other context sources. For example, different devices can share their own local context information through the remote rendezvous point 440. Privacy management can be performed by a local rendezvous point on each device using desired policies to ensure a device does not share private or secure information publicly with the remote rendezvous point 440.

In step 472, the application 410 can send a query to the local rendezvous point 430 to inquire about sources of context information. In step 474, the local rendezvous point 430 can return a report to the application 410 providing the application 410 with information about the local context source 420. In step 475, the application 410 can send a join request to the local rendezvous point 430 to request to join a session with the local context source 420 to receive context information updates from the local context source 420 via the local rendezvous point 430. In step 476, the local rendezvous point 430 can provide context information updates from the local context source 420 to the application 410. If the application 410 no longer requires the context information updates from the local context source 420, in step 478 the application 410 can send a leave request to the local rendezvous point 430 to stop the context information updates from the local context source 420. Thus, the local rendezvous point 430 can end the session with the application 410 after providing context information.

In step 480, the application 410 can send a query to the local rendezvous point 430 to inquire about remote sources of context information. In step 482, the local rendezvous point 430 can forward the query to the remote rendezvous point 440 to inquire about applicable remote context sources, such as the remote context source 450. Alternately, the same query can be used to inquire about information both from the local context source 420 and the remote context source 450. Thus, the application 410 may not need to send a separate query in step 480 and the query from step 472 may be forwarded to the remote rendezvous point 440 in step 482. For example, the same query from step 472 or a separate query in step 482 can be forwarded to the remote rendezvous point 440 if the desired context source not available locally.

Locally available context information at the local rendezvous point 430 can include context information provided by the local context source 420 and can include context information previously obtained from the remote context source 450 that is valid at the time of receiving the local join request in step 475. If the requested information is information that can be provided by the local context source 420 or the requested information has already been downloaded from a network, such as from the remote context source 450, and the requested information is still valid, the local rendezvous point 430 can return the requested information directly to the application 410 without forwarding the query to the remote rendezvous point 440 in step 482. Otherwise, if the requested information is not available locally, the same query from step 472 or a separate query from step 480 can be forwarded in step 482 to the remote rendezvous point 440 to request desired context information updates available from the remote context source 450 via the remote rendezvous point 440.

In step 484, the remote rendezvous point 440 can return a report to the local rendezvous point 430 to provide information about the remote context source 450. In step 486, the local rendezvous point 430 can forward the report to the application 410. In step 487, the application 410 can send a join request to the local rendezvous point 430 to request to join a session with the remote context source 450 to receive context information updates from the remote context source 450. In step 488, the local rendezvous point 430 can forward the join request to the remote rendezvous point 440. In step 490, the remote rendezvous point 440 can provide context information updates from the remote context source 450 to the local rendezvous point 430. If another application associated with the local rendezvous point 430 had already joined a session to receive context information from the remote context source 450, the local rendezvous point 430 will already be receiving corresponding context information from the remote rendezvous point 440 and it may not be necessary to forward a separate join request in step 488 from the local rendezvous point 430 to the remote rendezvous point 440 to receive context information updates from the remote context source 450.

The join request in steps 475 and/or 488 or the queries in steps 472 and/or 480 can include context information provided by the application 410. For example, the application 410 can add local context information to the join request sent to the remote rendezvous point 440 to better focus a search for requested information and the local context information can provide elaboration on the requested information. The added local context information can provide filter information to the remote rendezvous point 440 for focusing a search for context sources and context information. When the application 410 provides the resulting context information to a user, it can inform user that the information was filtered. If the application 410 or the user requires broader information, a new query or join request can be resubmitted without the filter information.

In step 492, the local rendezvous point 430 can provide context information updates from the remote context source 450 to the application 410. If the application 410 no longer requires the context information updates from the remote context source 450, in step 494 the application 410 can send a leave request to the local rendezvous point 430 to stop the context information updates from the remote context source 450. If all applications corresponding to the local rendezvous point 430 no longer require context information updates from the remote context source 450, in step 496 the local rendezvous point 430 can send a leave request to the remote rendezvous point 440 to stop context information updates from the remote rendezvous point 440. For example, a session can end when the application 410 sends a leave message to the local rendezvous point 430 to stop providing updated context information, a session can end after a selected time period, a session can end if a context source becomes unavailable, or a session can end for any other useful reason. The leave request can stop context information updates from a rendezvous point to an application when the application no longer requires the updates. The remote rendezvous point 440 can also stop updates towards the local rendezvous point 430 if all applications connected to the corresponding local rendezvous point 430 have left the session.

The local rendezvous point 430 can have registration and lookup mechanisms for local and remote context sources. The local rendezvous point 430 can also have a repository of local context source descriptions. Likewise, the remote rendezvous point 440 can have a repository of remote context source descriptions. Remote context sources can be registered with the remote rendezvous point 440 and can be accessed via the local rendezvous point 430 when a local application requires them. For example, the remote rendezvous point 440 can include a shared memory where, after registration, each context source can be assigned a location and, upon receiving a join request from an application, the remote rendezvous point 440 can update its data. The local rendezvous point 430 can keep a registry of local context sources and map the remote rendezvous point 440 to a cache location that is updated only upon a request from the application 410. The remote rendezvous point 440 can also map the local rendezvous point 430 to a memory location so access can be bi-directional.

Figure 5:
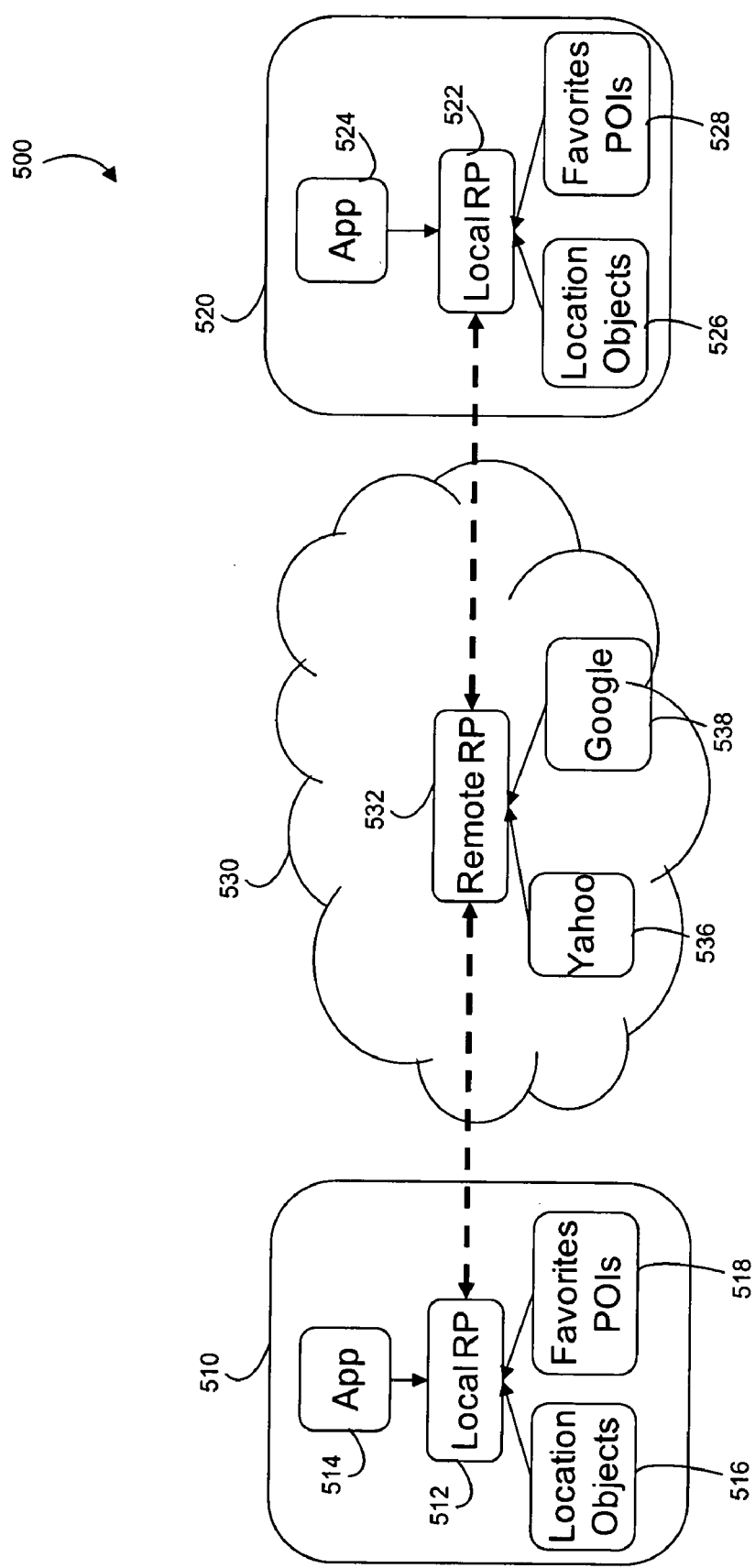
FIG. 5 is an exemplary block diagram of a system according to a possible embodiment.

FIG. 5 is an exemplary block diagram of a system 500 according to a possible embodiment. The system 500 can include devices 510 and 520 and a network 530. The network 530 can include a remote rendezvous point 532 remote from the devices 510 and 520. The devices 510 and 520 can include local rendezvous points 512 and 522. Each local rendezvous point 512 and 522 can be in a peering relationship with the remote rendezvous point 532 to form corresponding virtual data source registries. The device 510 can include at least one application 514 and can include local context sources 516 and 518. The device 520 can include at least one application 524 and can include local context sources 526 and 528. The local context sources 516 and 526 can be global positioning system receivers that can provide local position information. The local context sources 518 and 528 may include favorite points of interest stored on the devices 510 and 520. Other context sources can be used, such as an input device that can receive context information provided by a user, a wireless local area network transceiver that can receive context information from nearby wireless sources, or other context sources. The network 530 can include remote context sources 536 and 538, such as Internet search engines, yellow pages, directories, or other remote context sources. The remote context sources 536 and 538 can be registered with the remote rendezvous point 532.

As an example of operation, a first user of the device 510 and a second user of the device 520 may desire to have dinner together near the location of the user of the device 510. By using a virtual data source registry including the rendezvous points 512, 522, and 532, a context aware application 514 can provide the first user of the device 510 with an aggregated list of suggested restaurants. The list can be based on context information such as the location of the device 510 obtained from the local context source 516, the first user's favorite points of interest from the local context source 518, the second user's favorite points of interest from the local context source 528, sponsored links from yellow pages at the remote context source 536, search results from a search engine at the remote context source 538, and/or other context information. The second user of the device 520 can obtain similar information in a similar manner.

Virtual data source registries having the rendezvous points 512, 522, and 532 can operate efficiently because there is no need to pre-configure the devices 510 and 520 to access remote information from the remote context sources 536 and 538. The pre-configuration is not necessary because the remote context sources 536 and 538 can advertise themselves to the remote rendezvous point 532, get registered, and become available to applications upon a query request. Also, location information on the device 510 and other context information can be transmitted to the remote rendezvous point 532 to better focus research on remote context sources 536 and 538. The location of the first user of the device 510 may be available locally on the device 520 or it can be requested by the application 524 or the local rendezvous point 522 from the remote rendezvous point 532. If privacy policies of the devices allow public transmission of data from the devices 510 and 520, such as location objects or favorite points of interest, other devices can access the data via the local rendezvous points 512 and 522. Additionally, by using a join mechanism, applications 514 and 524 on the devices 510 and 520 can access information simultaneously, which can optimize network bandwidth usage. After a leave request or after a timeout, the transmission of context information can be stopped.

Figure 6:
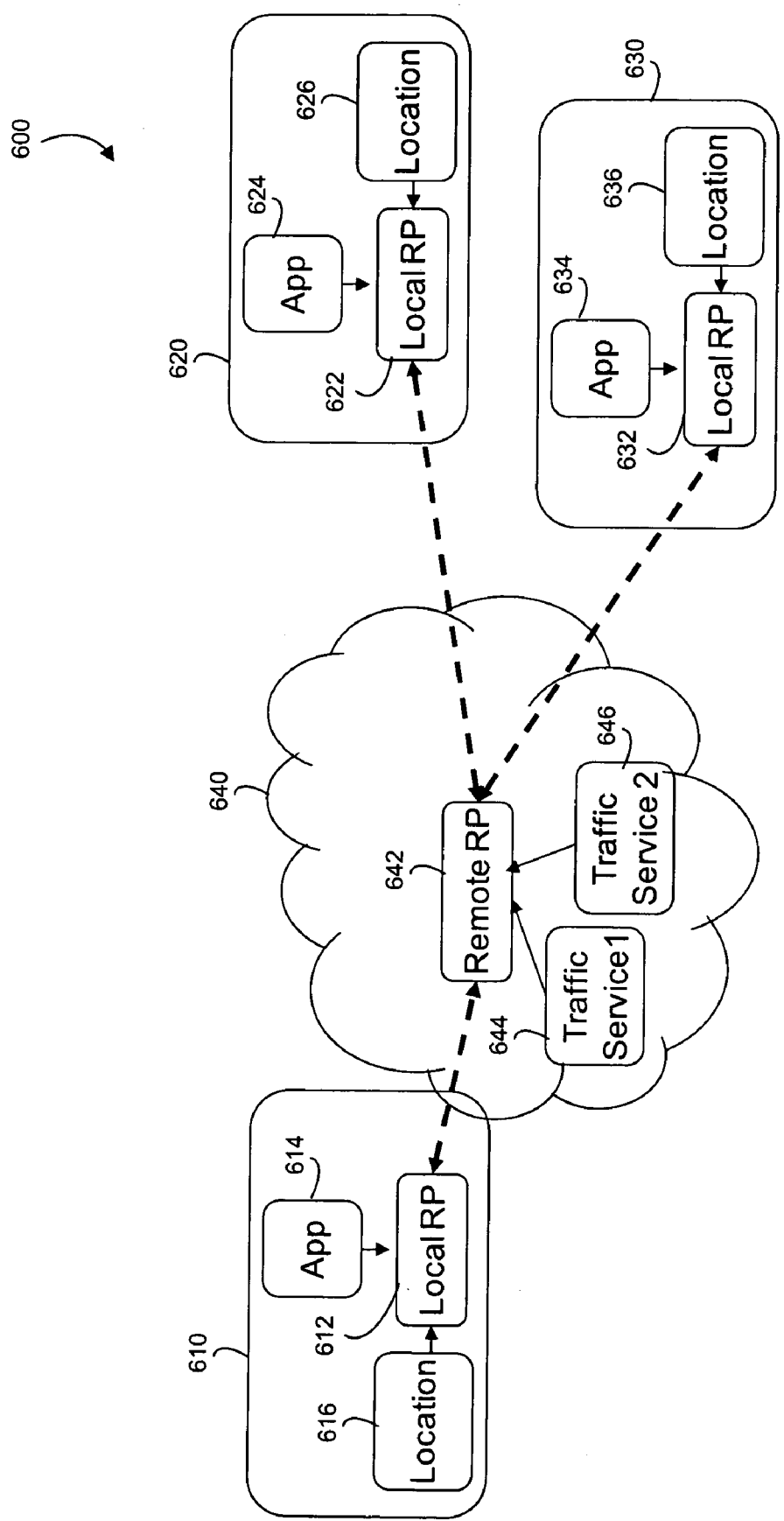
FIG. 6 is an exemplary block diagram of a system according to a possible embodiment.

FIG. 6 is an exemplary block diagram of a system 600 according to a possible embodiment. The system 600 can include devices 610, 620, and 630 and a network 640. The network 640 can include a remote rendezvous point 642 remote from the devices 610, 620, and 630. The devices 610, 620, and 630 can include local rendezvous points 612, 622, and 632, respectively. Each local rendezvous point 612, 622, and 632 can be in a peering relationship with the remote rendezvous point 642 to form corresponding virtual data source registries. The device 610 can include at least one application 614 and can include a local context source 616. The device 620 can include at least one application 624 and can include a local context source 626. The device 630 can include at least one application 634 and can include a local context source 636. The local context sources 616, 626, and 636 can be global positioning system receivers that can provide local position information. The network 640 can include remote context sources 644 and 646, such as traffic services. The remote context sources 644 and 646 can be registered with the remote rendezvous point 642.

As an example of operation, a context aware traffic information service, such as the context source 644 can gather information from different context sources, such as motorway sensors, local web services, and other relevant sources using a virtual data source registry. By using corresponding virtual data source registries, the service can provide, to all registered users of the devices 610, 620, and 630, real-time information about traffic situations and accidents near the users' current locations based on context information from the context sources 616, 626, and 636 in the devices 610, 620, and 630. Thus, ad-hoc user groups can be created based, in this case, on location and network sources can transmit context information simultaneously to multiple users.

The embodiments can provide an end to end access solution that can overcome limitations of both client-centric and network-centric approaches. Rendezvous points can be used with Internet Protocol multicast transmission and a two layer, local and remote, system can be identified while enabling query/report and join/leave communication mechanisms. At least one local rendezvous point and at least one remote rendezvous point can be peered to create a virtual data source registry. The remote rendezvous point can include a shared memory where, after registration, each data source can be assigned a location and, upon a join request from an application, the remote rendezvous point can update its data. The local rendezvous point can keep a registry of local sources and can map the remote rendezvous point to a cache location that can be updated only upon a request from an application. On the other side, if allowed by privacy policies, the remote rendezvous point can map the local rendezvous point to a memory location so data access can be bi-directional.

Multicast mechanisms can be used for the communication and transmission process. Local context sources can make their data available and advertise themselves to a local rendezvous point that is peered with a remote rendezvous point. The local rendezvous point and the remote rendezvous point together can be seen from applications on a device as a single virtual data source registry. Remote context sources, such as web based services like internet calendars, can transmit their data to the remote rendezvous point. Each local rendezvous point on a client device can be seen from the remote rendezvous point as a collection of virtual context sources. When an application needs context data, it can query the local rendezvous point using a join mechanism. If the required information can be provided by a local context source or if the information has already been downloaded from a network and is still valid, the local rendezvous point can return the information directly. Otherwise, if the information is provided by a remote context source, the information can be forwarded from the remote rendezvous point using the same join mechanism. A mechanism to plug-in new data sources can be provided. New network sources can be dynamically discovered and made available to applications without the need to reconfigure or recompile device software.

The embodiments can optimize local storage on a device and can optimize network bandwidth usage. The dynamic join/leave mechanism can reduce information traffic between applications and context sources. When an application joins a session it is not necessarily permanently connected, but can be soft-permanent connected only when updated information flows. When an application does not require any more data from a context source, it can leave the connection. A local or remote context source can provide information using a dynamic join/leave mechanism that then can multicast the information to all requesting applications on the same device and to all local rendezvous points on different devices that requires the information simultaneously. In this way information traffic can be reduced and network bandwidth usage can be better optimized.

The embodiments can support effective context sharing between different devices through a remote rendezvous point. The embodiments can also simplify simultaneous delivery of data from a remote context source to different devices and can create ad-hoc groups based, for example, on device locations or other parameters. The embodiments can also provide improved scalability and usability because network context sources can be virtualized and can be accessible from the applications in the same way as the local context sources. Adding a new remote context source does not require any local configuration at a client device side. The new source can advertise itself to a remote rendezvous point can become accessible by a local rendezvous point and corresponding applications. The embodiments can also provide distributed intelligence. A device can add local context information to the request to a remote rendezvous point to better focus a search or to provide further elaboration. A local rendezvous point can manage privacy issues using policies to regulate information shared with a remote rendezvous point.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

I claim:

1. A method comprising:
   providing a virtual data source registry comprising a peer relationship between a local rendezvous point local to a device and a remote rendezvous point remote from the device, the local rendezvous point receiving and providing locally available context information available local to the device and the remote rendezvous point receiving and providing remotely available context information available remote from the device;
   receiving, at the virtual data source registry, join requests from multiple applications, the join requests requesting context information from a context source, the join requests including a local join request from a device application in the device to the local rendezvous point, the join requests comprising requests to join a context information sharing session to receive information updates from at least one context source;
   receiving context information at the virtual data source registry from the context source;
   returning locally available context information from the local rendezvous point to the device application in response to receiving the local join request; and
   multicasting remotely available context information from the remote rendezvous point to the multiple applications in response to receiving the join requests,
   wherein the method further comprises:
      receiving an advertisement of a local context source at the local rendezvous point from the local context source; and
      registering the local context source at the local rendezvous point in response to receiving the advertisement,
   wherein the local join request comprises a first local join request, and
   wherein the method further comprises:
      receiving a second local join request at the local rendezvous point from a device application in the device after receiving the first local join request, the second local join request requesting context information from a remote context source; and
      sending the second local join request from the local rendezvous point to the remote rendezvous point only if the second local join request is for context information from a context source that was not requested by the first local join request.

2. The method according to claim 1,
   wherein the local join request includes a request to join a session with a context source to provide context information from the context source to the device application, and
   wherein the method further comprises ending the session with the device application after providing context information.

3. The method according to claim 1, further comprising:
   receiving an advertisement of a remote context source at the remote rendezvous point from the remote context source; and
   registering the remote context source at the remote rendezvous point.

4. The method according to claim 1, further comprising:
   querying the local rendezvous point with a query from the device application, the query for a context source of context information; and
   returning, from the local rendezvous point to the device application, local context source information about a local context source of context information,
   wherein the local join request includes a request for context information from the local context source, and
   wherein returning locally available context information includes providing local context information from the local context source to the device application via the local rendezvous point.

5. The method according to claim 1, further comprising:
   querying the local rendezvous point with a context source query from the device application, the context source query for a context source of context information; and
   returning, from the local rendezvous point to the device application, remote context source information about a remote context source of context information in response to the local rendezvous point receiving the context source query.

6. The method according to claim 5, further comprising:
   sending, from the local rendezvous point to the remote rendezvous point, the context source query for a context source of context information; and
   receiving, at the local rendezvous point from the remote rendezvous point, remote context source information about a remote context source of context information in response to sending the context source query.

7. The method according to claim 5, further comprising:
   forwarding the local join request from the local rendezvous point to the remote rendezvous point, the forwarded local join request requesting context information from the remote context source; and
   providing context information to the device application from the remote context source via the remote rendezvous point and the local rendezvous point after forwarding the local join request.

8. The method according to claim 1, wherein the local join request includes context information provided by the device application.

9. A device comprising:
   a housing;
   a local context source coupled to the housing;
   a controller coupled to the housing, the controller configured to control operations of the device and configured to execute a device application; and
   a virtual data source registry, the virtual data source registry including a local rendezvous point local to the device and including information provided from a remote rendezvous point remote from the device, the remote rendezvous point providing remotely available context information available remote from the device, the local rendezvous point configured to access locally available context information, the virtual data source registry configured to receive join requests from multiple applications, the join requests requesting context information from at least one context source, the join requests including a local join request from the device application to the local rendezvous point the join requests comprising requests to join a context information sharing session with a context source, the virtual data source registry configured to receive context information from the at least one context source, the virtual data source registry configured to return the locally available context information from the local rendezvous point to the device application in response to receiving the local join request, and the virtual data source registry configured to multicast remotely available context information from the remote rendezvous point to the multiple applications in response to receiving the join requests, wherein the virtual data source registry is further configured to receive an advertisement of a local context source at the local rendezvous point from the local context source and register the local context source at the local rendezvous point in response to receiving the advertisement, wherein the local join request comprises a first local join request, and wherein the virtual data source registry is further configured to receive a second local join request at the local rendezvous point from a second device application local in the device after receiving the first local join request, the second local join request requesting context information from at least one context source remote from the device, and wherein the virtual data source registry is further configured to send the second local join request from the local rendezvous point to the remote rendezvous point only if the second local join request is for context information from a context source that was not requested by the first local join request.

10. The device according to claim 9, wherein the local join request includes a request to join a session with the at least one context source to provide context information from the at least one context source to the device application, and wherein the virtual data source registry is configured to end the session with the device application after providing the context information.

11. The device according to claim 9, wherein the virtual data source registry is configured to receive an advertisement of the local context source at the local rendezvous point from the local context source and register the local context source at the local rendezvous point.

12. The device according to claim 9, wherein the local rendezvous point is configured to receive a query from the device application, the query for a context source of context information, and the local rendezvous point is configured to return, to the device application, local context source information about the local context source in response to receiving the query, wherein the local join request includes a request for locally available context information from the local context source, and wherein the virtual data source registry is configured to return the locally available context information from local context source to the device application via the local rendezvous point in response to receiving the local join request.

13. The device according to claim 9, wherein the controller is configured to query the local rendezvous point with a query from the device application, the query for a context source of context information, and wherein the local rendezvous point is configured to return, to the device application, remote context source information about a remote context source of remote context information in response to receiving the query.

14. The device according to claim 13, wherein the local rendezvous point is configured to send the query for a context source to the remote rendezvous point, configured to receive, from the remote rendezvous point, remote context source information about a remote context source of context information, and configured to forward the remote context source information to the device application via the controller.

15. The device according to claim 13, wherein the local rendezvous point is configured to forward the local join request to the remote rendezvous point to request the remote context information from the remote context source and configured to provide the remote context information to the device application from the remote context source via the remote rendezvous point.

16. The device according to claim 9, wherein the local join request includes context information provided by the device application.

17. A method comprising:

entering a peer relationship between a first rendezvous point and a plurality of device rendezvous points to create a virtual data source registry between the first rendezvous point and each of the plurality of device rendezvous points, where a rendezvous point receives and provides access to context information from at least one context source;

receiving context information at the first rendezvous point from a context source;

receiving, at the first rendezvous point, join requests from the plurality of device rendezvous points, the join requests requesting the context information from the context source, the join requests including a device join request from a device application sent via a corresponding device rendezvous point the join requests comprising requests to join a context information sharing session with a context source;

multicasting the context information from the first rendezvous point to the plurality of device rendezvous points in response to receiving the join requests;

receiving a leave request at the first rendezvous point from the device application sent via the corresponding device rendezvous point, the leave request comprising a request to leave a context information sharing session with at least one context source; and ceasing multicasting context information from the first rendezvous point to the corresponding device rendezvous point in response to receiving the leave request wherein the context source comprises a first context source, wherein the method further comprises:
receiving an advertisement of a second context source at the first rendezvous point from the second context source; and
registering the second context source at the first rendezvous point in response to receiving the advertisement of the second context source,
wherein the join requests include a first join request, and wherein the method further comprises:
receiving a second join request at the first rendezvous point from a device including an application that sent the first join request; and
sending the second join request from the first rendezvous point to a remote rendezvous point only if the second join request is for context information from a context source that was not requested by the first join request.

18. The method according to claim 17, further comprising:
receiving an advertisement of the first context source at the first rendezvous point from the first context source, the advertisement informing the first rendezvous point of context information available from the first context source;
registering, in response to receiving the advertisement, the first context source with the first rendezvous point to receive context information from the first context source;
receiving a context source query at the first rendezvous point from the device rendezvous point, the context source query including a query for the first context source; and
returning, from the first rendezvous point to the device rendezvous point, context source information about the first context source in response to receiving the context source query.

* * * * *